US010968782B2

(12) United States Patent
Spangler et al.

(10) Patent No.: US 10,968,782 B2
(45) Date of Patent: Apr. 6, 2021

(54) ROTATABLE VANES

(71) Applicant: UNITED TECHNOLOGIES CORPORATION, Farmington, CT (US)

(72) Inventors: Brandon W. Spangler, Vernon, CT (US); Michael G. McCaffrey, Windsor, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 1027 days.

(21) Appl. No.: 15/408,710

(22) Filed: Jan. 18, 2017

(65) Prior Publication Data
US 2018/0202321 A1 Jul. 19, 2018

(51) Int. Cl.
*F01D 25/34* (2006.01)
*F01D 11/08* (2006.01)
*F01D 9/04* (2006.01)
*F01D 25/24* (2006.01)
*F01D 25/28* (2006.01)
*F01D 25/16* (2006.01)
*F01D 25/00* (2006.01)
*F01D 9/02* (2006.01)
(Continued)

(52) U.S. Cl.
CPC .............. *F01D 25/34* (2013.01); *F01D 5/225* (2013.01); *F01D 9/00* (2013.01); *F01D 9/02* (2013.01); *F01D 9/04* (2013.01); *F01D 9/041* (2013.01); *F01D 9/042* (2013.01); *F01D 11/08* (2013.01); *F01D 25/00* (2013.01); *F01D 25/16* (2013.01); *F01D 25/24* (2013.01); *F01D 25/28* (2013.01); *F05D 2220/32* (2013.01); *F05D 2230/60* (2013.01); *Y02T 50/60* (2013.01)

(58) Field of Classification Search
CPC ... F01D 5/225; F01D 9/00; F01D 9/02; F01D 9/04; F01D 9/042; F01D 25/00; F01D 25/16; F01D 25/28
See application file for complete search history.

(56) References Cited

U.S. PATENT DOCUMENTS 3,085,398 A     4/1963   Ingleson
3,632,224 A *   1/1972   Wright .................. F01D 17/162
                                                   415/149.4

(Continued)

FOREIGN PATENT DOCUMENTS

EP           1475516       11/2004

OTHER PUBLICATIONS

European Patent Office, European Search Report dated Jun. 13, 2018 in Application No. 17202876.3.

*Primary Examiner* — Phutthiwat Wongwian
*Assistant Examiner* — Arnold Castro
(74) *Attorney, Agent, or Firm* — Snell & Wilmer L.L.P.

(57) ABSTRACT

A gas turbine engine, having an engine central longitudinal axis, includes at least one of a vane support, a vane stage, a blade outer air seal support, and a blade outer air seal. At least one of the vane support, the vane stage, the blade outer air seal support, and the blade outer air seal is rotatable about the engine central longitudinal axis. The gas turbine engine may further include a drive system configured to rotate at least one of the vane support, the vane stage, the blade outer air seal support, and the blade outer air seal about the engine central longitudinal axis.

16 Claims, 7 Drawing Sheets

(51) Int. Cl.
*F01D 9/00* (2006.01)
*F01D 5/22* (2006.01)

(56) References Cited

U.S. PATENT DOCUMENTS 4,714,404 A * 12/1987 Lardellier ............... F01D 11/22
15/171
2006/0013681 A1 1/2006 Cardarella, Jr.
2010/0083669 A1* 4/2010 Foster .................... B64D 31/04
60/802
2016/0061117 A1* 3/2016 Emmet .................... F02C 3/04
415/148

* cited by examiner

ROTATABLE VANES

FIELD

The present disclosure relates to gas turbine engines, and more specifically, to a turbine section of a gas turbine engine.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

The efficiency of the engine can be increased by passing a higher temperature gas flow through the turbine. However, the turbine inlet temperature is limited by the vane and blade (airfoils) material properties and the cooling capabilities of these airfoils. For example, first stage vanes that are located downstream from the combustor may be susceptible to excessive oxidation due to the high temperature of the combustion gases leaving the combustor section.

SUMMARY

In various embodiments, the present disclosure provides a gas turbine engine, having an engine central longitudinal axis, that includes at least one of a vane support, a vane stage, a blade outer air seal support, and a blade outer air seal. At least one of the vane support, the vane stage, the blade outer air seal support, and the blade outer air seal is rotatable about the engine central longitudinal axis. The gas turbine engine may further include a drive system configured to rotate at least one of the vane support, the vane stage, the blade outer air seal support, and the blade outer air seal about the engine central longitudinal axis.

In various embodiments, the drive system includes a drive motor and a drive gear. In such embodiments, at least one of the vane support, the vane stage, the blade outer air seal support, and the blade outer air seal include a circumferentially extending gear teeth track such that the drive gear complementarily engages the gear teeth track. The drive gear may be a spur gear or a worm screw. The drive motor may be mounted to a turbine case. For example, the drive motor may be mounted to a radially outward surface of the turbine case, the drive system may include a drive shaft coupled between the drive motor and the drive gear, and the drive shaft may extend through the turbine case. In various embodiments, the drive system includes a bearing disposed around the drive shaft.

In various embodiments, the gear teeth track is disposed on the vane support. For example, the gear teeth track may be disposed on a forward facing surface of the vane support, on an aft facing surface of the vane support, or on a radially outward facing surface of the vane support. A bearing track may be disposed between the vane support and a turbine case.

Also disclosed herein, according to various embodiments, is a method of operating a gas turbine engine. The method includes, according to various embodiments, rotating at least one of a vane support, a vane stage, a blade outer air seal support, and a blade outer air seal of a gas turbine engine about an engine central longitudinal axis of the gas turbine engine. Rotating at least one of the vane support, the vane stage, the blade outer air seal support, and the blade outer air seal may include driving a drive gear that engages a circumferentially extending gear teeth track disposed on the vane support to rotate the vane support and the vane stage.

In various embodiments, rotating at least one of the vane support, the vane stage, the blade outer air seal support, and the blade outer air seal includes discrete incremental periodic rotational movements. In various embodiments, rotating at least one of the vane support, the vane stage, the blade outer air seal support, and the blade outer air seal includes continuous rotational movement. The continuous rotational movement may be between 6 rotations per minute and 20 rotations per minute.

Also disclosed herein, according to various embodiments, is a method of manufacturing a gas turbine engine. The method includes forming a circumferentially extending gear teeth track on at least one of a vane support, a vane stage, a blade outer air seal support, and a blade outer air seal of a turbine section of the gas turbine engine, according to various embodiments. The method may also include engaging a drive gear with the gear teeth track.

In various embodiments, the method includes forming a pass-through hole in a turbine case of the turbine section of the gas turbine engine and inserting the drive gear of a drive system through the pass-through hole to engage the drive gear with the gear teeth track. In various embodiments, the method may further include mounting a drive motor of the drive system to a radially outward surface of the turbine case of the turbine section of the gas turbine engine.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Figure 1:
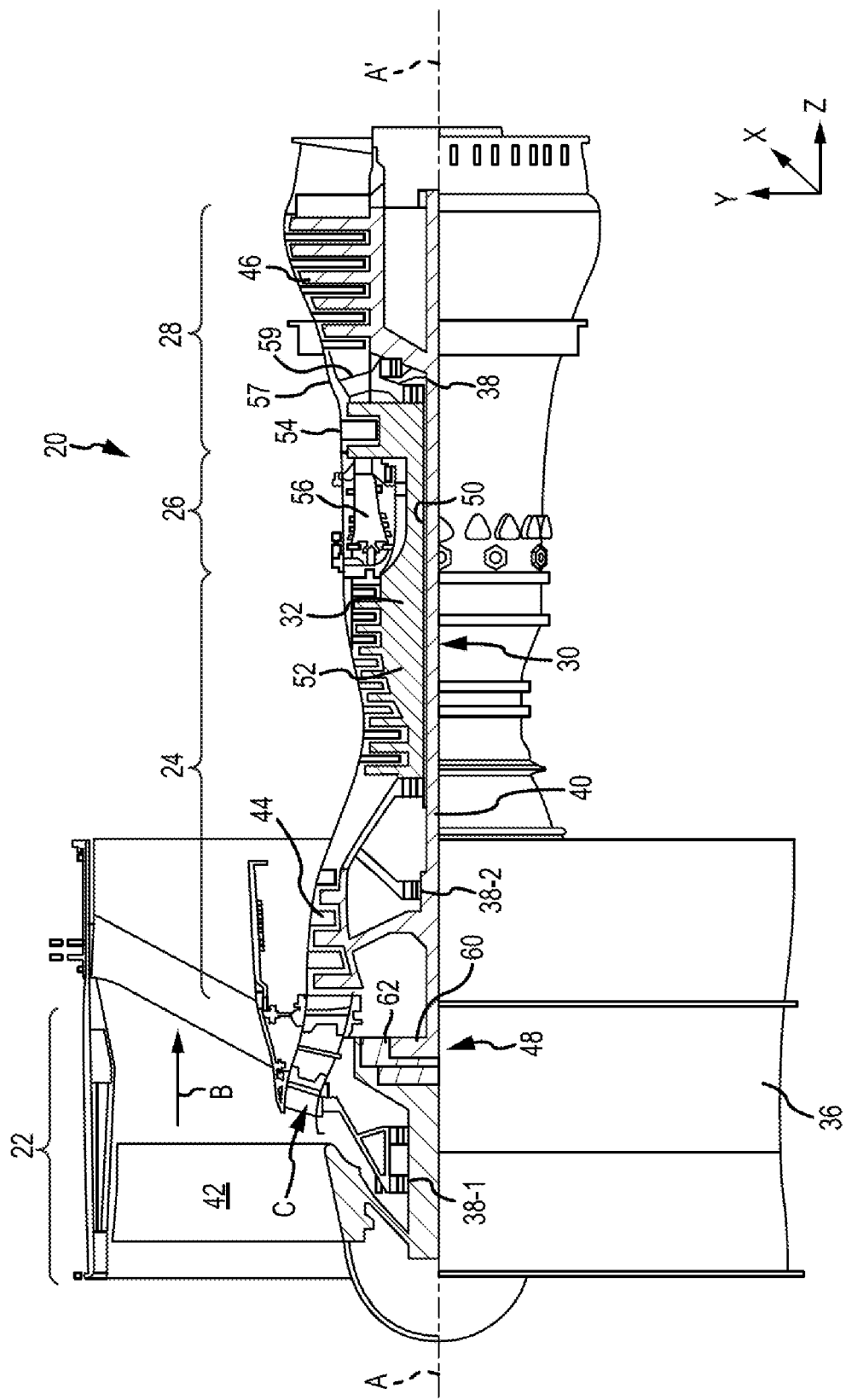
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (i.e., a sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

As mentioned above, hot combustion gases from the combustor can potentially deteriorate the mechanical integrity and diminish the lifecycle of downstream turbine components. These negative effects may be especially true for conventionally static turbine components (e.g., stators), such as vanes, vane supports, blade outer air seals ("BOAS"), and/or BOAS supports. That is, because the temperature of the hot combustion gases is not uniform and because such temperature non-uniformity produces discrete hot spots, conventionally static (i.e., non-rotating) hardware that is located downstream of and in fluid contact with the hot spots may be especially susceptible to oxidation and/or other deleterious temperature effects.

Accordingly, the present disclosure provides, according to various embodiments, a gas turbine engine that has at least one traditionally static component that is rotatable. For example, a vane support, a vane stage, a BOAS support, and/or BOAS may be configured to rotate so that not just a single portion of the component is directly downstream of the hot spot. Such components are often annular structures that extend around the engine central longitudinal axis and thus, by rotating these traditionally static components, the higher temperature of the hot spot does not only affect a discrete portion of the component.

Figure 2:
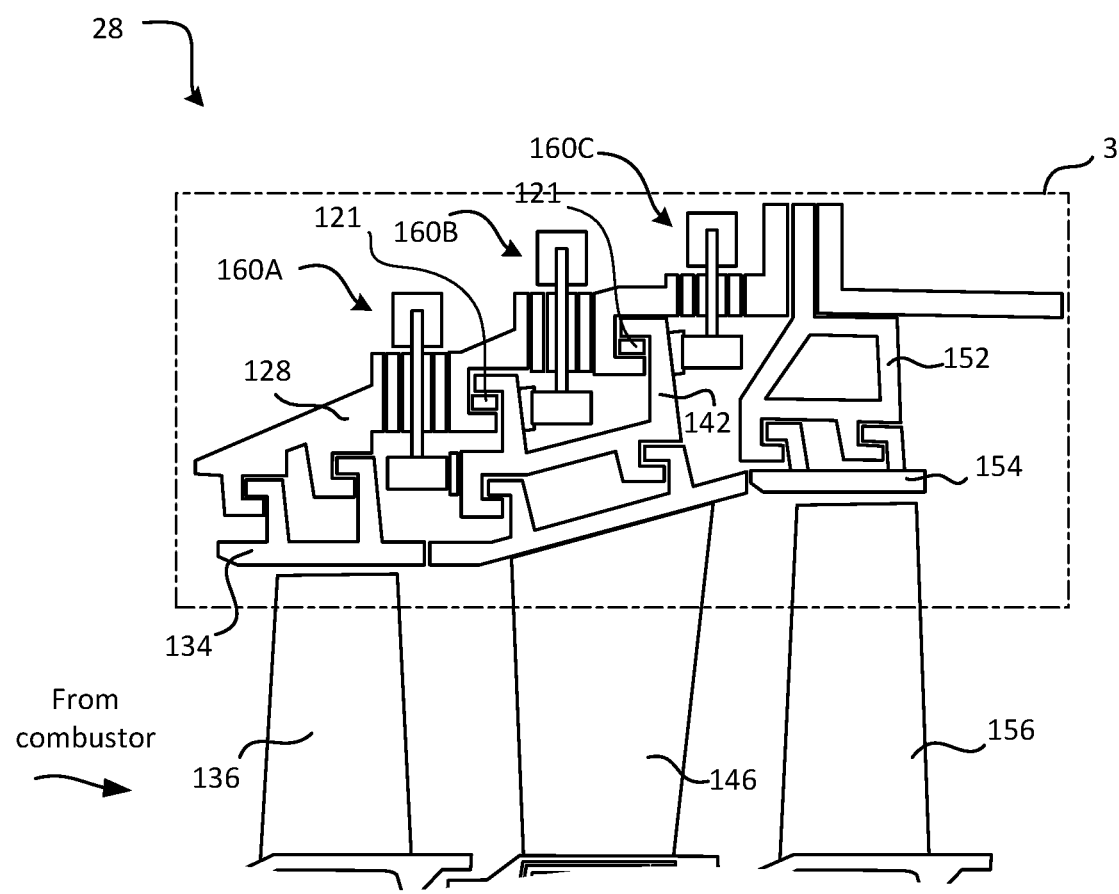
FIG. 2 illustrates a cross-sectional view of a turbine section of a gas turbine engine having a drive system, in accordance with various embodiments.

In various embodiments, and with reference to FIG. 2, the turbine section 28 of the gas turbine engine 20 is provided. The turbine section 28 may include one or more vane stages 146 and one or more blade stages 136, 156. As used herein, the term "vane stage" refers to an annular array of vanes and the term "blade stage" refers to an annular array of blades. As mentioned below, the vane stage 146 may be formed of multiple arcuate sections or the vane stage 146 may be a unitary, hoop structure. In various embodiments the vane stage 146 is coupled to a vane support 142 and in various embodiments the blade stage(s) 136, 156 have a BOAS 134, 154 located radially outward from the blades. The BOAS may be coupled to a BOAS support 152.

In various embodiments, rotation of at least one of the traditionally static components (e.g., the vane support 142, the vane stage 146, the BOAS support 152, and/or the BOAS 134, 154) may be passive. For example, the vane support 142 coupled to the vane stage 146 may be coupled to the turbine case 128 via bearings and the flow of hot combustions gases from the combustor may cause the vanes to rotate. The gas turbine engine may include various brakes and/or pins that restrain and/or limit the rotation of the vanes. In various embodiments, the rotation of at least one of the traditionally static components, such as the vane support 142 and the vane stage 146, may be accomplished using a drive system. The drive system, according to various embodiments, may include one or more drive units 160A, 160B, 160C, as described in greater detail below with reference to FIG. 2, that actively and controllably rotate at least one of the traditionally static components about the engine central longitudinal axis. With a drive system, for example, each vane of the vane stage 146 may be configured to spend about the same amount of time directly downstream of the hot spots, thereby spreading the heat load across all of the vanes instead of concentrating the heat load from one of the hot spots on just one of the vanes. Additional details pertaining to rotation methods are included below.

Figure 3:
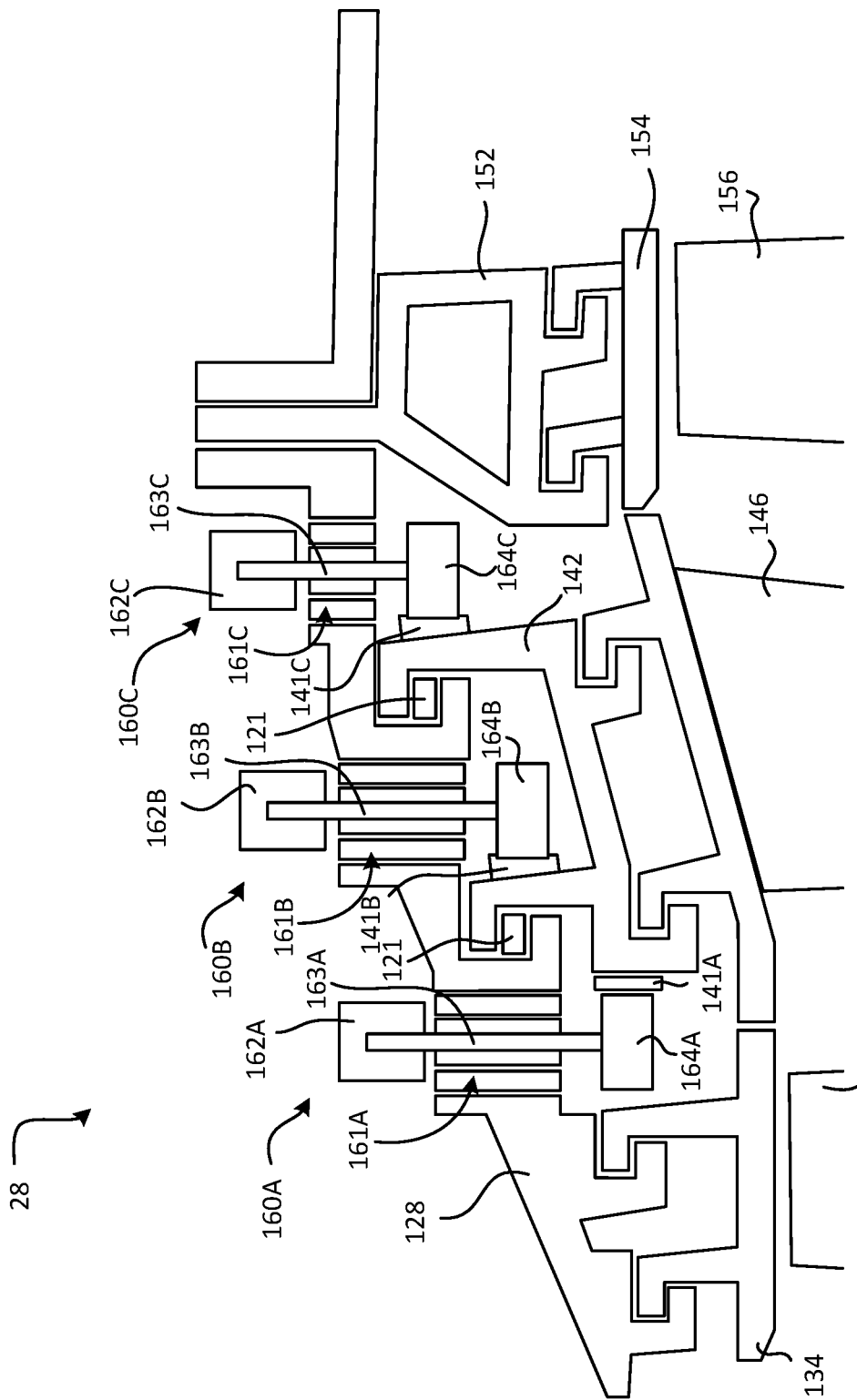
FIG. 3 illustrates a magnified cross-sectional view of the turbine section of the gas turbine engine of FIG. 2, in accordance with various embodiments.

In various embodiments, and with reference to FIG. 3, one or more drive units 160A, 160B, 160C are provided for imparting rotation to the vane stage 146 via the vane support 142. While numerous details and examples are included herein pertaining to rotation of the vane stage 146 and vane support 142, such details may also be applicable to the BOAS support 152 and/or the BOAS 134, 154. Further, while numerous details are included herein pertaining to the drive system engaging the vane support 142, the drive system may be configured to directly engage the vane stage 146.

In various embodiments, the drive unit(s) 160A, 160B, 160C include a drive motor 162A, 162B, 162C coupled to a drive gear 164A, 164B, 164C. The drive gear 164A, 164B, 164C may be configured to engage a complementary and circumferentially extending gear teeth track 141A, 141B, 141C disposed on a surface of the vane support 142. The drive motor 162A, 162B, 162C may be coupled to and controlled by a controller and may be configured to drive rotation of the drive gear 164A, 164B, 164C via a drive shaft 163A, 163B, 163C. With the drive gear 164A, 164B, 164C engaged with the complementary gear teeth track 141A, 141B, 141C, rotation of the drive gear 164A, 164B, 164C causes the gear teeth track 141A, 141B, 141C to circumferentially translate through the drive gear 164A, 164B, 164C, which results in rotation of the vane support 142 and vane stage 146.

As described in greater detail below with reference to FIGS. 3 and 5, the drive unit of the drive system may be mounted to stationary component such as the turbine case 128, such as a radially outward surface of the turbine case 128, and the drive shaft 163A, 163B, 163C may extend through/across the turbine case 128. In various embodiments, bearings 161A, 161B, 161C may be disposed around the drive shaft 163A, 163B, 163C. Additional bearings, such as a bearing track 121, may be disposed between the vane support 142 and the turbine case 128, thereby allowing relative rotation between the turbine case 128 (static) and the vane support 142 and vane stage 146.

In various embodiments, the gear teeth track 141A may be located and disposed on a forward facing surface of the vane support 142. In various embodiments, the gear teeth track 141B, 141C may be disposed on an aft facing surface of the vane support 142. In various embodiments, and with brief reference to FIG. 5, the gear teeth track 541 may be disposed on a radially outward surface of the vane support 142. The gear teeth track may be disposed on the BOAS 134, 154, the BOAS support 152, and/or directly on the vanes/vane stage 146.

The various components of the turbine section 28, such as the vane support 142, the BOAS support 152, the BOAS 134, 154, and the vane stage 146, may be annular, hoop-like structures that that extend circumferentially around the engine central longitudinal axis of the gas turbine engine. Each of these components may be a unitary, continuous hoop or each of these components may be made from a plurality of arcuate segments that cumulatively form the annular structure. The components of the turbine section 28, such as the vane support 142, the BOAS support 152, the BOAS 134, 154, and the vane stage 146, may be made from a nickel based alloy and/or a cobalt based alloy, among others. For example, these components may be made from a high performance nickel-based super alloy or a cobalt-nickel-chromium-tungsten alloy. In various embodiments, the rotatable, traditionally static components of the turbine section may be made from other metals or metal alloys, such as stainless steel, etc. In various embodiments, these components are made of ceramic materials and/or ceramic matrix composites, among other materials.

Figure 4:
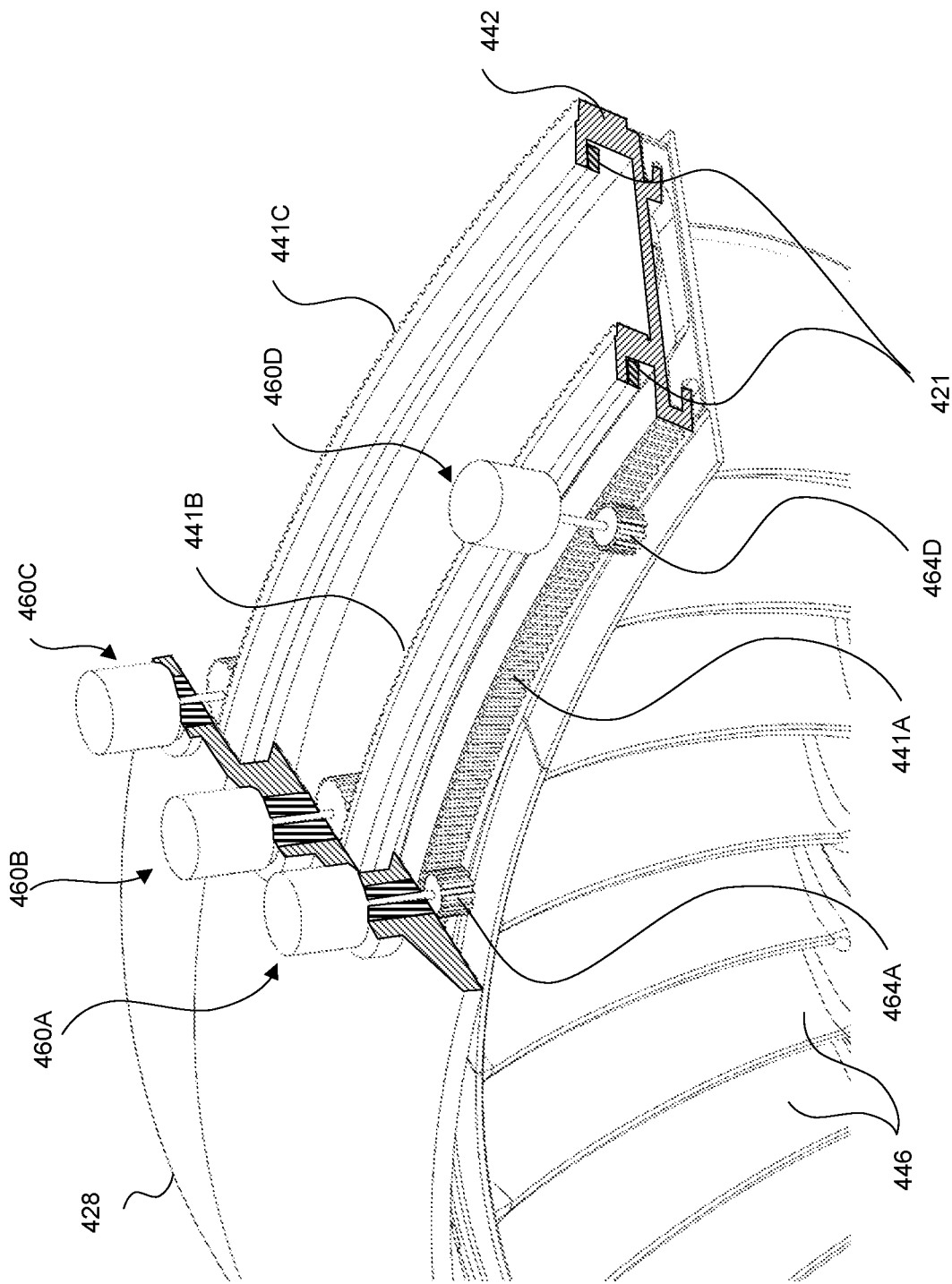
FIG. 4 illustrates a partial cutaway perspective view of a turbine section of a gas turbine engine having a drive system, in accordance with various embodiments.

In various embodiments, and with reference to FIG. 4, multiple drive units 460A, 460B, 460C, 460D are provided for driving rotation of the vanes 446. The drive units 460A, 460B, 460C, 460D may be mounted to a radially outward surface of the turbine case 428. The drive gear may be spur gear 464A, 464D that engages one or more gear teeth tracks 441A. The drive system may include multiple drive units that are spaced apart axially from each other, such as drive units 460A, 460B, 460C. The drive system may also include multiple drive units that are spaced apart circumferentially from each other, such as drive units 460A and 460D.

Circumferentially spaced apart drive units 460A, 460D may engage the same gear teeth track 441 or may engage different gear teeth tracks.

Figure 5:
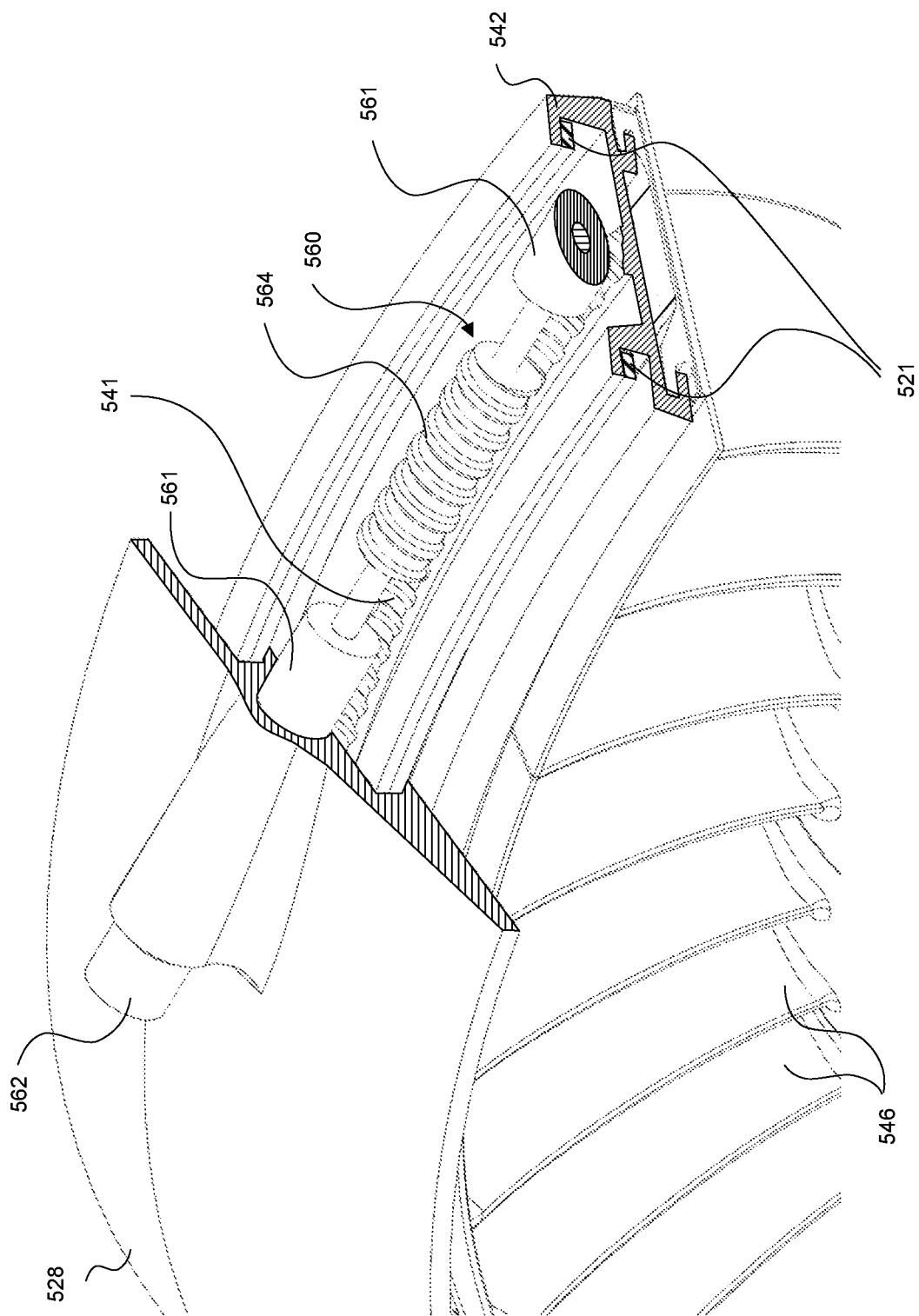
FIG. 5 illustrates a partial cutaway perspective view of a turbine section of a gas turbine engine having a drive system, in accordance with various embodiments.

In various embodiments, and with reference to FIG. 5, the drive system may include one or more drive units 560 for driving rotation of the vanes 546. The drive unit 560 may include a worm gear or a worm screw 564 as the drive gear. As mentioned above, the worm screw 564 may engage a gear teeth track 541 that is disposed on a radially outward surface of the vane support.

In various embodiments, a method of operation of the gas turbine engine includes rotating at least one of a vane support, a vane stage, a blade outer air seal support, and a blade outer air seal of a gas turbine engine about an engine central longitudinal axis of the gas turbine engine. Rotating at least one of the vane support, the vane stage, the blade outer air seal support, and the blade outer air seal may include discrete incremental periodic rotational movements. For example, the drive system may be configured to move the vanes a certain angular distance at certain intervals. In various embodiments, the incremental angular distance may be equal to the pitch of the vane stage (e.g., angular distance between adjacent vanes of the vane stage). In such embodiments, each vane may be configured to spend an equal time directly downstream of the hot spot(s), thus allowing the heat load from the hot spots to be distributed across all of the vanes of the vane stage instead of being focused on one or a few vanes (as would be the situation in the traditional, static vane configuration). In various embodiments, the discrete incremental rotation may be actuated via the drive system before each flight, in response to the passage of a certain number of hours of engine operation, etc.

In various embodiments, rotating at least one of the vane support, the vane stage, the blade outer air seal support, and the blade outer air seal includes continuous rotational movement. For example, the drive system may be configured to continuously rotate the vanes through the hot spot(s) during operation. In various embodiments, the rate of the continuous rotational movement is such that each vane is not directly downstream of the hot spot(s) long enough to reach a threshold temperature. For example, the drive system may be configured to maintain the rotational speed of the vanes above 6 rotations per minute ("RPM"). In such embodiments, each vane would pass through the hot spot in less than 0.15 seconds, which is less than the time it takes for the vane to reach peak steady state temperature (e.g., about 0.5 seconds). In various embodiments, the drive system may be configured to maintain the rotational speed of the vanes between 6 RPM and 20 RPM.

Figure 6A:
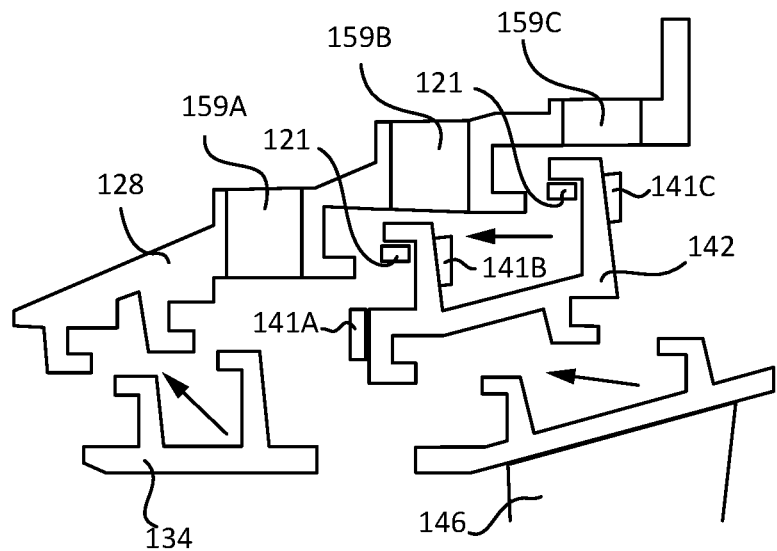
FIGS. 6A and 6B illustrate schematic cross-sectional views of a method of manufacturing a turbine section of a gas turbine engine, in accordance with various embodiments.
Figure 6B:
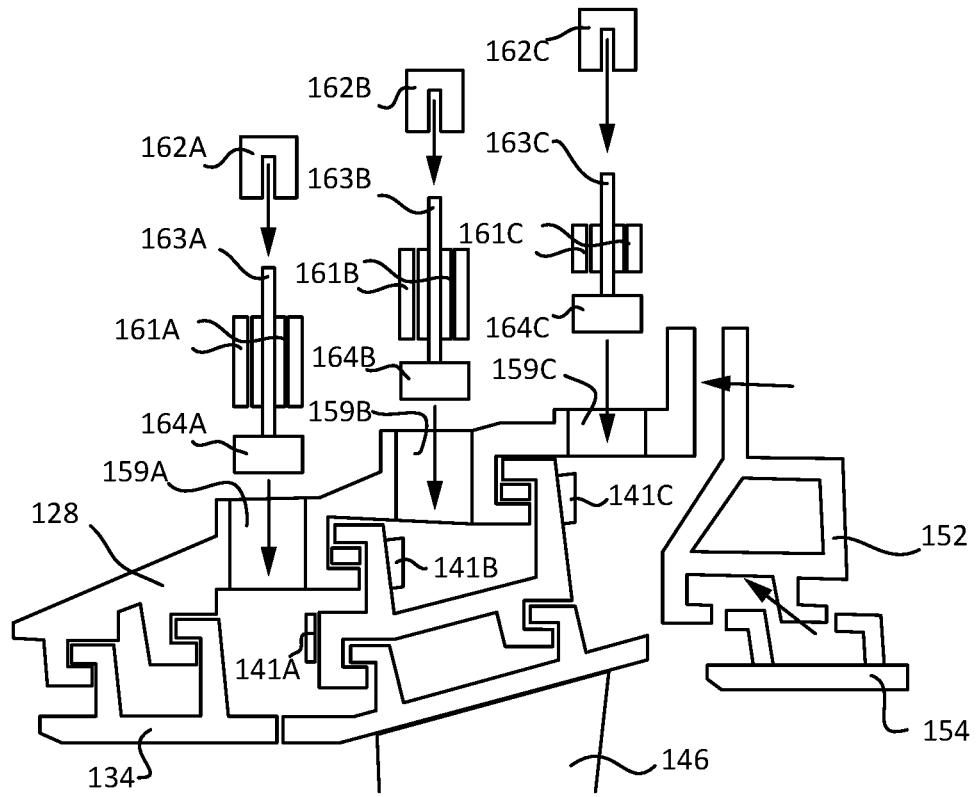
Figure 7:
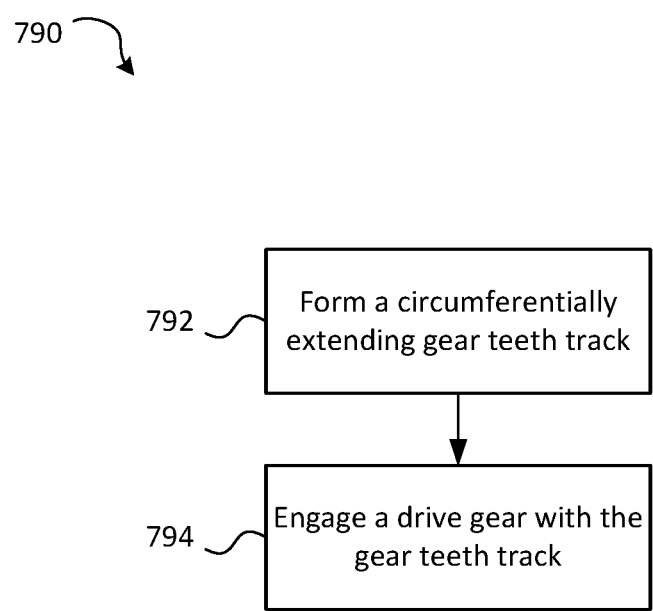
FIG. 7 is a schematic flow chart diagram of a method of manufacturing a gas turbine engine, in accordance with various embodiments.

In various embodiments, and with reference to FIGS. 6A, 6B, and 7, a method 790 of manufacturing/assembling a gas turbine engine is provided. The method 790 includes, according to various embodiments, forming a circumferentially extending gear teeth track 141A on at least one of a vane support, a vane stage, a blade outer air seal support, and a blade outer air seal of a turbine section of the gas turbine engine at step 792. The method may further include engaging a drive gear with the gear teeth track at step 794.

In various embodiments, the method 790 may also include forming a pass-through hole 159A in a turbine case 128. This step may include forming multiple pass-through holes 159A, 159B, 159C and step 792 may include forming multiple gear teeth tracks 141A, 141B, 141C. The method 790 may include inserting multiple drive gears 164A, 164B, 164C through the multiple pass-through holes 159A, 159B, 159C to engage the multiple gear teeth tracks 141A, 141B, 141C, respectively.

In various embodiments, the method includes forming a pass-through hole in a turbine case of the turbine section of the gas turbine engine and inserting the drive gear of a drive system through the pass-through hole to engage the drive gear with the gear teeth track. In various embodiments, the method may further include mounting a drive motor of the drive system to a radially outward surface of the turbine case of the turbine section of the gas turbine engine.

As mentioned above and according to various embodiments, the gear teeth tracks 141A, 141B, 141C may be formed on various surfaces of the vane support 142. The method 790 may further include positioning bearings 121 between the vane support 142 and the turbine case 128 before coupling the vane support 142 to the turbine case 128 via the bearings 121. The method 790 may include coupling the vane stage 146 to the vane support 142 and coupling BOAS 134 to the turbine case 128. The method 790 may further include attaching a second BOAS 154 to a BOAS support 152 and coupling the BOAS support 152 to the turbine case 128.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine having an engine central longitudinal axis, the gas turbine engine comprising:
    a vane stage; and
    a drive system;
    wherein the drive system is configured to rotate the vane stage around the engine central longitudinal axis such that the vane stage is configured to complete full rotations around the engine central longitudinal axis;
    wherein the drive system comprises a drive motor and a drive gear, the vane stage comprises a circumferentially extending gear teeth track, and the drive gear complementarily engages the gear teeth track.

2. The gas turbine engine of claim 1, wherein the drive gear comprises a spur gear.

3. The gas turbine engine of claim 1, wherein the drive gear comprises a worm screw.

4. The gas turbine engine of claim 1, wherein the drive motor is mounted to a turbine case.

5. The gas turbine engine of claim 4, wherein:
    the drive motor is mounted to a radially outward surface of the turbine case;
    the drive system comprises a drive shaft coupled between the drive motor and the drive gear;
    the drive shaft extends through the turbine case.

6. The gas turbine engine of claim 5, wherein the drive system comprises a bearing disposed around the drive shaft.

7. The gas turbine engine of claim 1, wherein the gear teeth track is disposed on a vane support that is disposed radially outward of a plurality of vanes forming the vane stage.

8. The gas turbine engine of claim 7, wherein the gear teeth track is disposed on a forward facing surface of the vane support.

9. The gas turbine engine of claim 7, wherein the gear teeth track is disposed on an aft facing surface of the vane support.

10. The gas turbine engine of claim 7, wherein the gear teeth track is disposed on a radially outward facing surface of the vane support.

11. The gas turbine engine of claim 7, wherein a bearing track is disposed between the vane support and a turbine case.

12. A method of operating a gas turbine engine, the method comprising:
    rotating at least one of a blade outer air seal support and a blade outer air seal of a gas turbine engine around an engine central longitudinal axis of the gas turbine engine, wherein rotating at least one of the blade outer air seal support and the blade outer air seal comprises continuous rotational movement during operation of the gas turbine engine.

13. The method of claim 12, wherein rotating at least one of the blade outer air seal support and the blade outer air seal comprises driving a drive gear that engages a circumferentially extending gear teeth track.

14. The method of claim 12, wherein a rate of the continuous rotational movement is between 6 rotations per minute and 20 rotations per minute.

15. A method of operating a gas turbine engine, the method comprising:
    rotating at least one of a vane support, a vane stage, a blade outer air seal support, and a blade outer air seal of a gas turbine engine around an engine central longitudinal axis of the gas turbine engine, wherein rotating at least one of the vane support, the vane stage, the blade outer air seal support, and the blade outer air seal comprises eventual complete rotations around the engine central longitudinal axis;
    wherein rotating at least one of the vane support, the vane stage, the blade outer air seal support, and the blade outer air seal comprises driving a drive gear that engages a circumferentially extending gear teeth track disposed on at least one of the vane support and the blade outer air seal support.

16. The method of claim 15, wherein rotating at least one of the vane support, the vane stage, the blade outer air seal support, and the blade outer air seal comprises discrete incremental periodic rotational movements.

\* \* \* \* \*